United States Patent

[11] 3,617,271

[72] Inventors Albert Lucien Poot
 Kontich;
 August Van den Heuvel, Berchem;
 Johannes Josephus Vanheertum,
 Hallezandhoven; Karel Eugeen Verhille,
 Mortsel, all of Belgium
[21] Appl. No. 831,994
[22] Filed June 10, 1969
[45] Patented Nov. 2, 1971
[73] Assignee Gevaert-Agfa N.V.
 Mortsel, Belgium
[32] Priority June 10, 1968
[33] Great Britain
[31] 27,525/68

[54] SENSITIZERS HAVING ONE OR MORE ELECTRON-WITHDRAWING GROUPS FOR ORGANIC PHOTOCONDUCTORS
7 Claims, No Drawings
[52] U.S. Cl............................................. 96/1.5,
 96/1.6, 96/106, 260/152, 260/141, 260/349
[51] Int. Cl....................................................... G03g 5/00
[50] Field of Search.......................................... 96/1.5, 1.6,
 106

[56] References Cited
 UNITED STATES PATENTS
3,174,854 3/1965 Rainer et al. ................. 96/1

FOREIGN PATENTS
1,089,095 11/1967 Great Britain
 OTHER REFERENCES
Hogel, On Photoelectric Effects in Polymers and Their Sensitization by Dopants, 3/65, 755–766

Primary Examiner—George F. Lesmes
Assistant Examiner—M. Wittenberg
Attorney—William J. Daniel ABSTRACT: An electrophotographic material comprising an organic photoconductor and as a sensitizer, a compound of the following formulae:

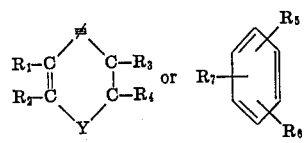

wherein: $R_1$, $R_2$, $R_3$ and $R_4$ are hydrogen, halogen, nitro, cyano, carboxyl, carbamoyl, aryl, or fused aromatic nuclei; Y is $CH_2$ or $CN_2$, and z is a chemical bond or $-SO_2-$; $R_5$ is azidosulfonyl or azidocarbonyl, $R_6$ is carboxyl, sulfo, azidocarbonyl, azidosulfonyl or a substituted fused arylene nucleus, and $R_7$ is hydrogen, fused arylene nucleus or other substituent.

SENSITIZERS HAVING ONE OR MORE ELECTRON-WITHDRAWING GROUPS FOR ORGANIC PHOTOCONDUCTORS

The present invention relates to electrophotography, more particularly to the sensitization of organic photoconductors of use in electrophotographic material.

A wide variety of organic nonpolymeric as well as polymeric compounds have been proposed for use as photoconductor. In this connection there can be mentioned: polymers or copolymers of heterocycles having vinyl substituents such as poly-N-vinylcarbazole, polymers or copolymers of polynuclear aromatic compounds substituted by vinyl such poly-9-vinyl-anthracene, nonpolymeric aromatic and heterocyclic photoconductors such as anthracene, chrysene, N-alkyl-carbazole, etc.

The photoconductive coatings of electrophotographic material generally also comprise one or more compounds causing an increase of the general sensitivity and/or of the sensitivity to electromagnetic rays from a particular part of the spectrum. Such sensitizing compounds may but need not necessarily themselves possess photoconductive properties. Activators of the so-called Lewis-acid type for increasing the general sensitivity of photoconductors are described e.g. in the United Kingdom Pat. Specification 942,810.

It has now been found that the general sensitivity of an electrophotographic material comprising a polymeric or nonpolymeric organic photoconductive substance can be increased by incorporating in the photoconductive layer one or more compounds comprising one or more electron-withdrawing groups or atoms and corresponding to the general formulas:

I.  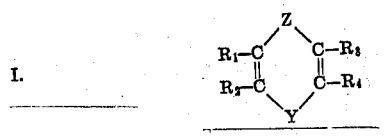

wherein:
each of $R_1$, $R_2$, $R_3$ and $R_4$ stands for hydrogen, an electron-withdrawing group or atom such as halogen, nitro, cyano, carboxyl, carbamoyl or an aryl group including a substituted aryl group, substituted e.g. by halogen, nitro or alkoxy, or $R_1$ together with $R_2$ and $R_3$ together with $R_4$ represent the atoms necessary to complete fused-on aromatic nuclei Y stands for $CH_2$ or $CN_2$, and Z stands for a chemical bond or $-SO_2-$, in the latter case, $R_2+R_2$ as well as $R_3+R_4$ being the necessary atoms to complete fused-on aromatic nuclei, II. 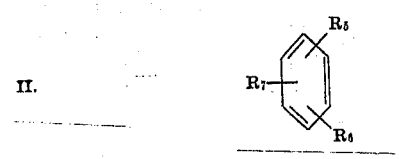

wherein:
$R_5$ stands for azidosulphonyl or azidocarbonyl, and $R_6$ stands for carboxyl, sulpho, azidocarbonyl, azidosulphonyl, or a fused-on arylene nucleus comprising a carboxyl, sulpho, azidosulphonyl or azidocarbonyl group, or $R_5$ together with $R_6$, standing in ortho-position relative to each other, represent the atoms necessary to close a ring structure of which the groups $SO_2$, $CN_2$ and CO or the groups CO, $CN_2$ and CO are composite parts, and $R_7$ represents a hydrogen atom, a fused-on arylene nucleus including a substituted arylene nucleus or a substituent for example, carboxyl, sulpho, halogen such as chlorine, alkyl, such as methyl, nitro, amino, etc.

In accordance with the present invention there is provided an electrophotograhic material comprising a photoconductive layer which contains an organic photoconductive substance and at least one compound comprising one or more electron-withdrawing groups or atoms and corresponding to one of the above general formulas.

The present invention further provides a method of increasing the sensitivity to light of an organic photoconductive layer which method comprises adding to an organic nonpolymeric or polymeric photoconductive substance one or more compounds comprising one or more electron-withdrawing groups or atoms and corresponding to one of the general formulas above.

The compounds having the structures listed below are representative of those falling within the scope of the above general formulas. Literature references as to the preparation of said compounds are included.

A. Compounds corresponding to general Formula I

1. Cl, Cl, Cl, Cl (C, H₂)   Ber. 88 (1955) 2003.

2. Cl, Cl, Cl, Cl (C, N₂)   Ber. 97 (1964) 735.

3. H₅C₆, C₆H₅, H₅C₆, C₆H₅ (C, N₂)   Ber. 97 (1964) 735.

4. NC, NC (C, N₂)   J. Am. Chem. Soc. 88 (1966) 4058

5. (fluorene structure, C, N₂)   Ber. 44 (1911) 2207.

6. (SO₂, C, H₂ structure)   Ann. 263 (1891) 15.

7. (SO₂, C, N₂ structure)   Ber. 97 (1964) 740.

8. (C, N₂ structure)   J. Am. Chem. Soc. 75 (1953) 5956-7.

9. NO₂ (C, N₂)   J. Am. Chem. Soc. 85 (1963) 1273-7

10. I, I (C, N₂)   J. Am. Chem. Soc. 85 (1963) 1273-7

11. NO₂ (C, N₂)   J. Am. Chem. Soc. 85 (1963) 1273-7

12. Br, Br, Br, Br (C, N₂)   J. Am. Chem. Soc. 85 (1963) 1273-7

B. Compounds corresponding to general Formula II

13. 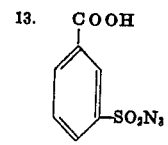
14. 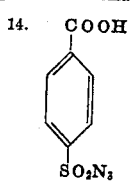
15. 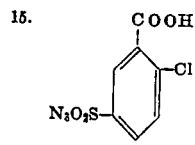
16. 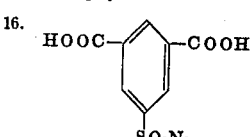
17. 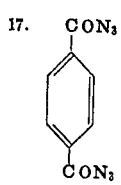
18. 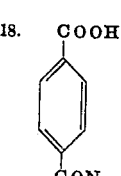
19. 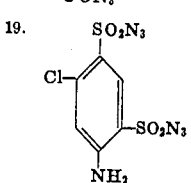
20. 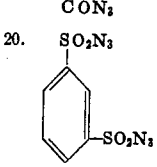
21. 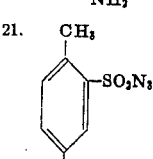
22. 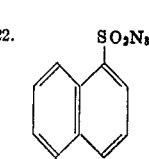
23. 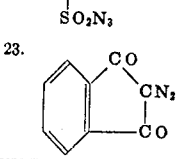
24. 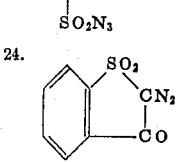

Compounds 13–22 can be prepared by reacting according to known methods, the corresponding acid chlorides with sodium azide. In this connection there can be referred to U.K. Pat. Specifications Nos. 1,062,884 and 1,089,095.

Compound 23 can be prepared as described in Ber. 97 (1964) 1482 and compound 24 can be prepared as described in Ber. 98 (1965) 36.

By means of the sensitizers of the invention electrophotographic materials can be prepared with photoconductor coatings having an improved degree of light-sensitivity.

The amount of sensitizer according to the present invention which is best added to the photoconductor is easily established by simple experiments. It varies according to the particular sensitizer and photoconductor employed and is generally comprised between 0.1 and 10 percent by weight relative to the amount of the photoconductor.

The photoconductors which can be sensitized with the compounds according to the present invention belong to the most varying classes of polymeric and nonpolymeric photoconductors. As a matter of fact it has been found that practically any organic polymeric or nonpolymeric aromatic or heterocyclic photoconductor is suitable, provided it is not hygroscopic or does not possess high electrical conductivity. The preferred substances are polynuclear aromatic and polynuclear heterocyclic compounds and polymers or copolymers therefrom which are either substituted or not, such as poly-N-vinylcarbazole, poly(1,2-dihydro-2,2,4-trimethylguinoline), p-(4,5-dihydro-1,3-diphenyl-5-pyrazolyl)-phenol, and 4,4′-bis-dimethylamino-3″-chlorotriphenylmethane.

When photoconductive polymers of low molecular weight or nonpolymeric photoconductors are used it is necessary in order to form a recording layer with a sufficient mechanical strength to apply these photoconductors with a macromolecular binding agent which is photoconductive or not.

Macromolecular compounds particularly suitable for use as binding agent for the photoconductors are e.g. natural resins such as dammar resin, gum arabic, manilla gum and sandara resin; microcystalline waxes; modified natural substances such as cellulose diacetate and cellulose triacetate; ethylcellulose, or other cellulose derivatives, pentaerythrite polyesters or modified colophonium resins and ester gums, polymerisates such as polyethylene, polystyrene and copolymers of styrene, polyvinyl acetate and copolymers of vinylacetate, polyvinylacetals of formaldehyde, acetaldehyde, butyraldehyde, polyacrylic acid esters and polymethacrylic acid esters and coumarine-indene resins, and polycondensates such as gylcerol-phthalate resins and other glyceryl polyesters, alkyd resins, polyethylene glycol esters, diethylene glycol polyesters, formaldehyde resins and silicone resins.

If desired one or more suitable plasticizers such as dibutyl phthalate, dimethyl phthalate, dimethylglycol phthalate, tricresyl phosphate, triphenyl phosphate, monocresyl diphenyl phosphate, etc. in quantities amounting say from 10 to 30 percent by weight relative to the amount of binding agent used can be added to the compositions for the formation of the photoconductive layers when these contain a binding agent.

Film-forming polymeric photoconductive substances can be applied without binding agent whereby it is possible to produce very smooth and transparent photoconductive layers and even self-supporting sheets.

Other additives well known in the art of preparing coatings for recording purposes may be used e.g. matting agents, fluorescing compounds, phosphors, optical brightening agents, agents controlling the adhesive power of the recording layer, agents controlling the elasticity, the plasticity, and the hardness of the recording layer, agents controlling the viscosity of the coating composition, anti-oxidants, gloss-improving agents, etc.

The electrophotographic material comprising an organic photoconductive substance the general sensitivity of which has been increased by the addition of the compounds of the present invention may also contain as is known in the art sensitizers, increasing the sensitivity to the electromagnetic rays from a particular part of the spectrum. Suitable spectral sensitizing compounds are amongst others the methine dyes are commonly employed for the spectral sensitization in silver halide photography of xanthene dyes of which the phthaleins and rhodamines are subclasses such as Rose Bengale (C.I. 45,440), Fluoresceine (C.I. 45,350), Rhodamine B (C.I. 45,170) and Crystal Violet (C.I. 42,555). These dyestuff sensitizers are preferably used in an amount of 0.1 to 5 percent of the weight of the photoconductive substances used.

For the preparation of an electrophotographic material according to the present invention various techniques can be applied.

In practice, the photoconductors are preferably first dissolved or dispersed in a suitable organic solvent such as ketones, e.g. acetone, chlorinated hydrocarbon atoms, e.g. methylene chloride, trichloroethylene, aliphatic esters e.g. ethyl acetate, benzene, dioxan, dimethyl formamide, or other organic solvents, or in mixtures of such solvents. The sensitizers and possibly also the other additives are added thereto. The solution or dispersion thus obtained is uniformly spread on a surface of a suitable support, for instance by centrifuging, spraying, brushing or coating, hereafter the layer formed is dried in such a way that a uniform photoconductive layer is formed on the surface of the support.

The thickness of the photoconductive layers is not critical but is open to choice within a wide range according to requirements in each individual case. Good results are attained with photoconductive layers of a thickness between 1 and 20 $\mu$ preferably between 3 and 10 $\mu$. Layers, which are too thin do not have a sufficient insulating power and layers which are too thick may possess undesireable mechanical properties.

In the manufacture of widely applicable electrophotographic recording materials according to the present invention a relatively conductive support for the recording layer is used, e.g. an electroconductive sheet or plate, or an insulating sheet or plate covered with an electro-conductive interlayer. Under electroconductive plate or sheet is understood a plate or sheet the specific resistivity of which is smaller than that of the photoconductive layer i.e. in general smaller than $10^9$ ohm.cm. Supports of the specific electrical resistivity of which is smaller than $10^7$ ohm.cm. are preferred.

Suitable conductive plates are for instance plates of metals such as aluminum zinc, copper, tin, iron or lead.

Suitable electroconductive interlayers for insulating supports are e.g. vacuum-coated metal layers such as silver or aluminum layers, transparent conductive polymer layers, e.g. applied from polymers containing quaternized nitrogen atoms, such as those described in the U.S. Pat. Specification No. 3,174,858 or layers containing dispersed in a binder conductive particles e.g. carbon black and metal particles. The binder used for said particles has preferably a specific resistivity lower than $10^6$ ohm.cm. A suitable binder for that purpose is gelatin.

It is possible to produce transparent photoconductive recording materials by applying the photoconductive substances from a clear solution onto a conductive transparent base or a transparent insulating base coated with an electroconductive transparent interlayer.

As transparent bases resin sheets having an optical density of not more than 0.10 are preferred e.g. a sheet made of polyethylene terephthalate or cellulose triacetate. The conductive interlayer preferably consists of a metal coating e.g. a vacuum-coated aluminum layer having an optical density of not more than 0.30 or of a conductive transparent polymer layer e.g. composed of an organic polyionic polymer e.g. a polymer containing quaternized nitrogen atoms such as a quaternized polyethylene imine polymer.

In reproduction techniques wherein the prints are to be produced on an opaque background preferably a paper sheet is used as support for the recording layer.

Paper sheets which have an insufficient electrical conductivity are coated or impregnated with substances enhancing their conductivity e.g. by means of a conductive overcoat such as a metal sheet laminated thereto.

As substances suited for enhancing the conductivity of a paper sheet and which can be applied in the paper mass are particularly mentioned hygroscopic compounds and antistatic agents as described e.g. in the U.S. Pat. Specification No. 3,131,060 and antistatic agents of polyionic type e.g. Calgon Conductive polymer 261 manufactured by Calgon Corporation, Calgon Center, Box 1346, Pittsburgh, U.S.A. Calgon is a registered trade mark.

Paper sheets are preferably impermeabilized for organic solvents e.g. by means of a water-soluble colloid or by strong hydration of the cellulose fibers such as in glassine paper.

Electrophotographic materials sensitized according to the present invention can be used in any of the different techniques known in recording with the aid of photoconductors. Thus, they can be used in a technique based on the discharge of an electrostatically charged recording layer by exposure to light.

The electrostatic charging of the photoconductive layer can be effected according to any one of the methods known in electrophotography, for instance by corona discharge.

The conversion of the electrostatic latent image, produced by exposure of the electrostatically charged recording layer, into a visible image can occur according to one of the techniques known in electrophotography, wherein use is made of the electrostatic attraction or repulsion of finely divided colored substances, which for instance are present in a powder mixture, in an electric insulating liquid (for instance in the form of an aerosol), or wherein electrostatic attraction is used for selectively wetting charged portions of the recording layer, as described in the United Kingdom Pat. Specifications 1,020,505 and in the U.S. Pat. Specification 3,383,209.

Evidently, the present invention is by no means limited to one or the other particular embodiment as regards the use of the sensitized electrophotographic materials, and the exposure technique, the charging method, the developing method, and the fixing. The method as well as the materials used in these methods can be adapted to the necessities.

The following examples illustrate the present invention without limiting, however, the scope thereof.

EXAMPLE 1

A solution of 4 g. of poly-N-vinylcarbazole in 100 ml. of methylene chloride was prepared. A sample of this unsensitized photoconductor composition was coated pro rate of about 2 g. of photoconductor per sq. m. on a sheet of aluminum foil laminated to a paper support.

Other samples of the unsensitized coating composition were sensitized by addition of 0.04 g. of representative sensitizing compounds according to the present invention. These samples ere coated as described above.

Each of the coated samples were negatively charged with a negative corona having a potential difference of −6,000 v. between the corona wires and the ground and than exposed by means of a 80 Watt high pressure mercury vapor lamp placed at a distance of 25 cm. through a step wedge having 0.30 log exposure increments between consecutive steps.

The latent wedge images where electrophoretically developed by means of an electrophoretic developer obtained by diluting the concentrated developer composition described hereinafter in a volume ratio of 15/1000 by means of a hydrocarbon solvent SHELLSOL T (trade name):

| | |
|---|---|
| carbon black (average particle size: 20 m$\mu$) | 30 g. |
| zinc monotridecyl phosphate | 1.5 g. |
| SHELLSOL T (trade name) | 750 ml. |
| resin solution prepared as described hereinafter | 150 g. |

The resin binder solution was prepared by heating 500 g. of ALKYDAL L 67 (trade name of Farbenfabriken Bayer A.G., Leverkusen, W. Germany for a linseed oil (67 percent by weight) modified alkyd resin) and 500 ccs. of white spirit containing 11 percent by weight of aromatic compounds at 60° C. till a clear solution was obtained, and subsequent cooling.

Relative speed values of the developed samples were calculated based on a comparison of the number of visible steps in the wedge images obtained in the sensitized photoconductor materials with the number of visible steps produced in an unsensitized poly-N-vinylcarbazole coating, given a relative speed of 100.

The following table lists the relative speed values for these coatings.

| Compound number | Relative speed |
|---|---|
| none | 100 |
| 1 | 3,200 |
| 2 | 400 |
| 3 | 200 |
| 4 | 400 |
| 6 | 3,200 |
| 7 | 3,200 |
| 13 | 800 |
| 17 | 3,200 |
| 24 | 1,600 |

From these data it may be seen that the relative speed of unsensitized poly-N-vinylcarbazole was increased up to 32 times by the addition of our compounds as sensitizers.

EXAMPLE 2

A coating composition was prepared that had the following composition:

| | |
|---|---|
| methylene chloride | 100 ml. |
| FLECTOL H (trade name of Monsanto Chemical Company, St. Louis, Mo., U.S.A. for poly(1,2-dihydro-2,2,4-trimethylquinoline) having a specific gravity of 1.12 at 25° C. | 4 g. |
| compound 6 | 0.2 g. |

The photoconductor used here is a photoconductor as described in United Kingdom Pat. application No. 4276/68.

This composition was coated pro rata of about 2 g. of photoconductor per sq. m. on a sheet of aluminum foil laminated to a paper support.

The electrophotographic material thus obtained was negatively charged with a negative corona, having a potential difference of −6000 V. between the corona wires and the ground, and then exposed by means of a 80 Watt high pressure mercury vapor lamp placed at a distance of 25 cm. through a step wedge having 0.30 log exposure increments between consecutive steps.

The electrostatic wedge image produced was electrophoretically developed as described in example 1.

When the number of visible steps in the wedge image obtained was compared with the number of steps produced in an identical way in an unsensitized electrophotographic material it was found that the speed of the sensitized material was 4 times faster than the speed of the unsensitized electrophotographic material.

EXAMPLE 3

An electrophotographic material was prepared as described in example 2 with the difference, however, that the photoconductor coating had the following composition:

| | |
|---|---|
| methylene chloride | 100 ml. |
| p-(4,5-dihydro-1,3-diphenyl-5-pyrazolyl)-phenol | 4 g. |
| copoly(vinyl acetate/vinyl chloride/maleic anhydride) (14/85/1) | 4 g. |
| compound 4 | 0.2 g. |

The compound p-(4,5-dihydro-1,3-diphenyl-5-pyrazolyl)-phenol used as a photoconductor is a photoconductor as described in Belgian Pat. Specification 563,045.

The material was then further treated as described in example 2 and it was found that the speed of the sensitized material was 4 times faster than the speed of an identical material.

EXAMPLE 4

An electrophotographic material was prepared as described in example 2 with the difference, however, that the photoconductor coating had the following composition:

| | |
|---|---|
| methylene chloride | 100 ml. |
| 4,4'-bisdimethylamino-3''-chloro-triphenylmethane | 4 g. |
| copoly(vinyl acetate/vinyl chloride/maleic anhydride) (14/85/1) | 4 g. |
| compound 24 | 0.2 g. |

The compound 4,4'-bisdimethylamino-3''-chloro-triphenylmethane used as photoconductor is a photoconductor as described in United Kingdom Pat. Specification No. 980,879.

The material was further treated as described in example 2 and it was found that the speed of the said material was 4 times faster as compared to the speed of an identical unsensitized material.

We claim:

1. An electrophotographic material comprising a layer or sheet containing an organic photoconductive substance and a compound which comprises one or more electron-withdrawing groups and is selected from the group consisting of compounds corresponding to the following general formulas I and II:

I 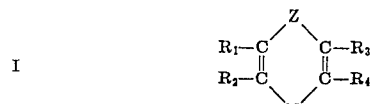

wherein:

each of $R_1$, $R_2$, $R_3$, and $R_4$ stands for a hydrogen atom, a halogen atom, a nitro group, a cyano group, a carboxyl group, a carbamoyl group, of an aryl group, or $R_1$ together with $R_2$ and $R_3$ together with $R_4$ represent the atoms necessary to complete fused-on aromatic nuclei, Y stands for $CH_2$ or $CN_2$, and Z stands for a chemical bond of $-So_2-$, in the latter case, $R_1+R_{2a}$ as well as $R_3+R_4$ being the atoms necessary to complete fused-on aromatic nuclei, II 

wherein:

$R_5$ stands for azidosulphonyl or an azidocarbonyl group and $R_6$ stands for a carboxyl group, a sulpho group, an azidocarbonyl group, an azidosulphonyl group or a fused-on arylene nucleus comprising a carboxyl group, a sulpho group, an azidocarbonyl group or an azidosulphonyl group, or $R_5$ together with $R_6$ in orthoposition relative to each other, represent the atoms necessary to close a ring structure of which either the groups $SO_2$, $CN_2$ and CO or the groups CO, $CN_2$ and CO are composite parts and $R_7$ represents a hydrogen atom a fused-on arylene nucleus, a halogen atom, an alkyl group, an amino group or a carboxy group.

2. An electrophotographic material according to claim 1 wherein the organic photoconductive substance is a nonpolymeric or polymeric substance containing at least one aromatic or heterocyclic ring.

3. An electrophotographic material according to claim 1, wherein the organic photoconductive substance is poly-N-vinylcarbazole.

4. An electrophotographic material according to claim 1, wherein the said compound comprising one or more electron-withdrawing groups is present in an amount comprised between 0.1 to 10 percent by weight relative to the amount of photoconductive substance, 5. An electrophotographic material according to claim 1, wherein said photoconductive layer is carried on an electrically conducting support.

6. An electrophotographic material according to claim 5, wherein the photoconductive layer comprises an organic photoconductor in association with natural resins or resinuous condensation or polymerisation products.

7. An electrophotographic material according to claim 1, wherein the organic photoconductive layer also comprises dyestuff sensitizers.

UNITED STATES PATENT OFFICE
CERTIFICATE OF CORRECTION

Patent No. 3,617,271        Dated November 2, 1971

Inventor(s) Albert Lucien POOT et al

It is certified that error appears in the above-identified patent and that said Letters Patent are hereby corrected as shown below:

Column 8, Claim 1, line 19, change "of" to -- or --.

line 23, change "of -$SO_2$- to -- or -$SO_2$- --.

line 24, change "$R_{2a}$" to -- $R_2$ --.

line 40, after "$R_6$", insert -- standing --.

Signed and sealed this 25th day of April 1972.

(SEAL)
Attest:

EDWARD M.FLETCHER,JR.
Attesting Officer

ROBERT GOTTSCHALK
Commissioner of Patents